H. A. HOUSE.
MACHINE FOR MAKING PAPER RECEPTACLES.
APPLICATION FILED JUNE 26, 1911.

1,113,217.  Patented Oct. 13, 1914.
13 SHEETS—SHEET 1.

Witnesses
H. N. Lamb
F. H. Beckwith

Inventor
Henry A. House
By Geo. D. Phillips
his Attorney

H. A. HOUSE.
MACHINE FOR MAKING PAPER RECEPTACLES.
APPLICATION FILED JUNE 26, 1911.

1,113,217.  Patented Oct. 13, 1914.
13 SHEETS—SHEET 3.

Witnesses
H. A. Lamb
F. H. Beckwith

Inventor
Henry A. House
By Geo. D. Phillips
his Attorney

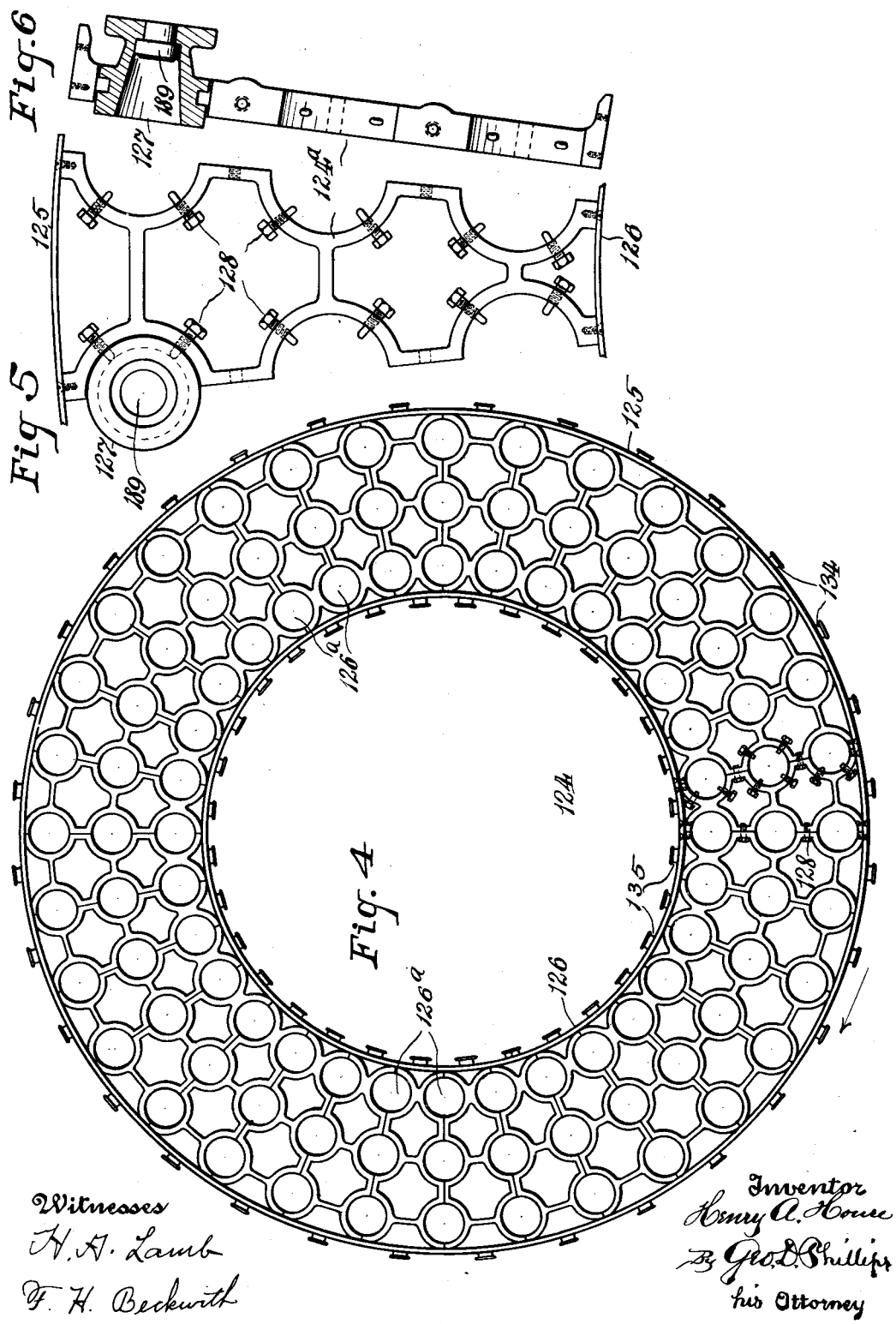

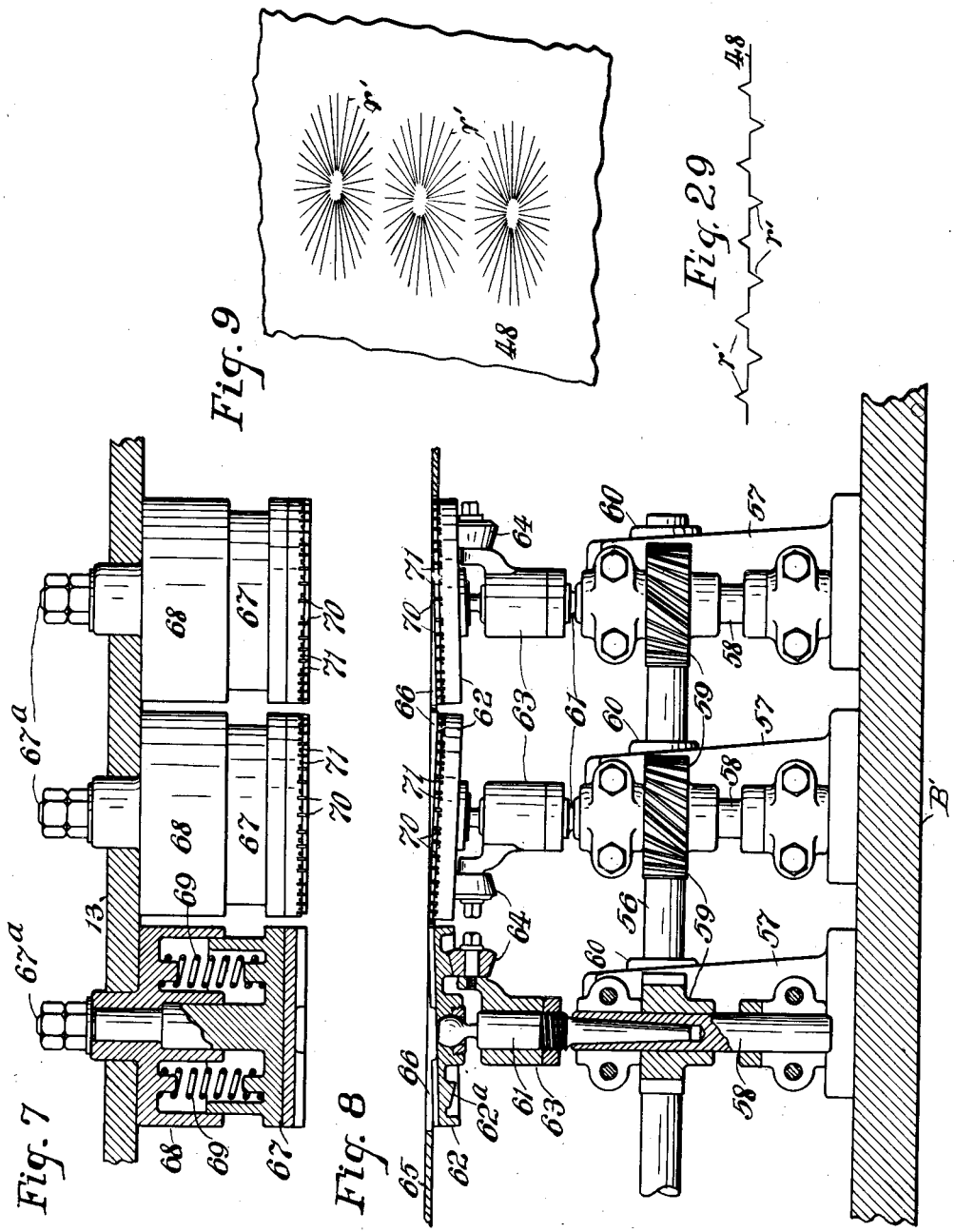

H. A. HOUSE.
MACHINE FOR MAKING PAPER RECEPTACLES.
APPLICATION FILED JUNE 26, 1911.
1,113,217.
Patented Oct. 13, 1914.
13 SHEETS—SHEET 6.
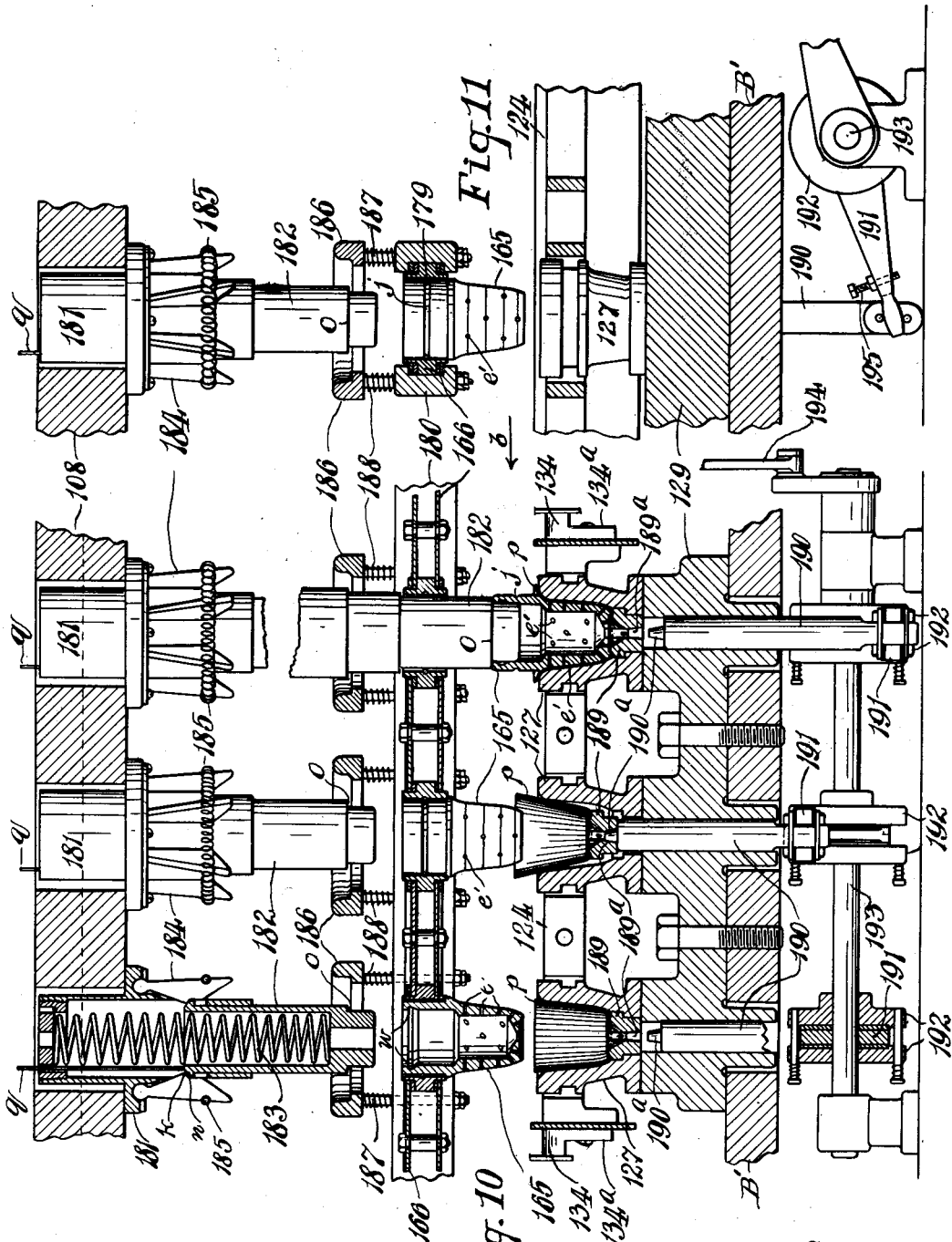
Witnesses
H. A. Lamb
F. H. Beckwith
Inventor
Henry A. House
By Geo. D. Phillips
his Attorney

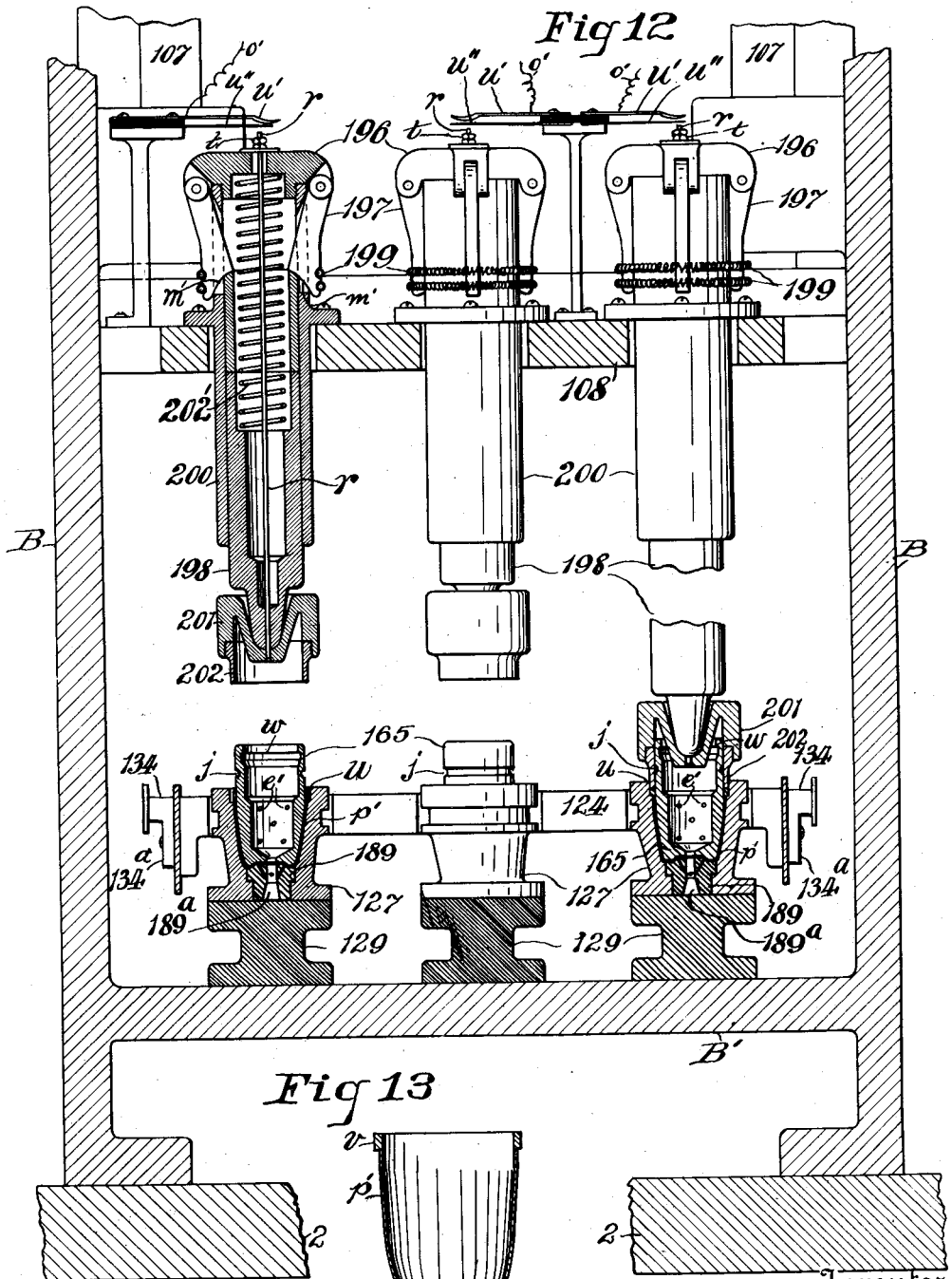

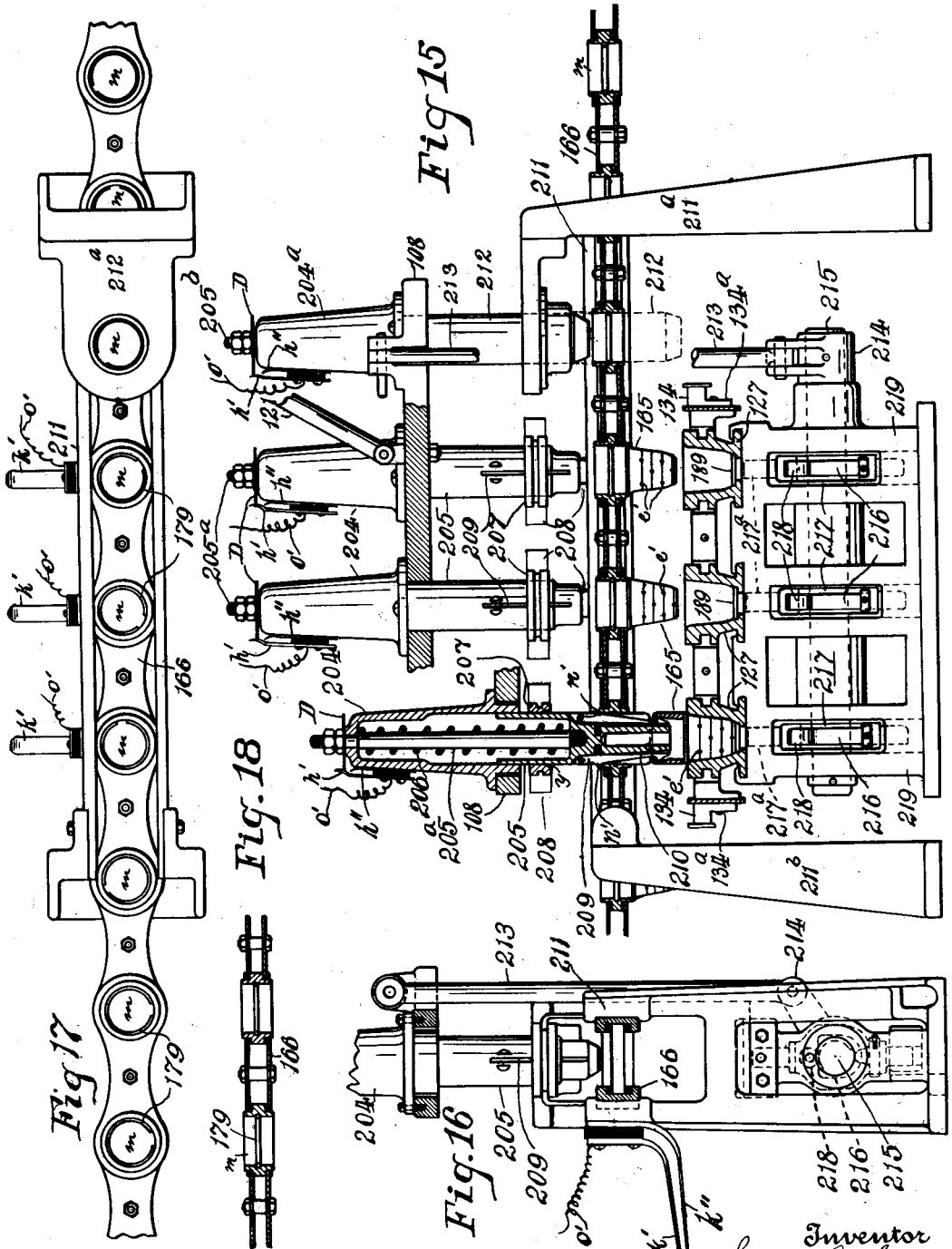

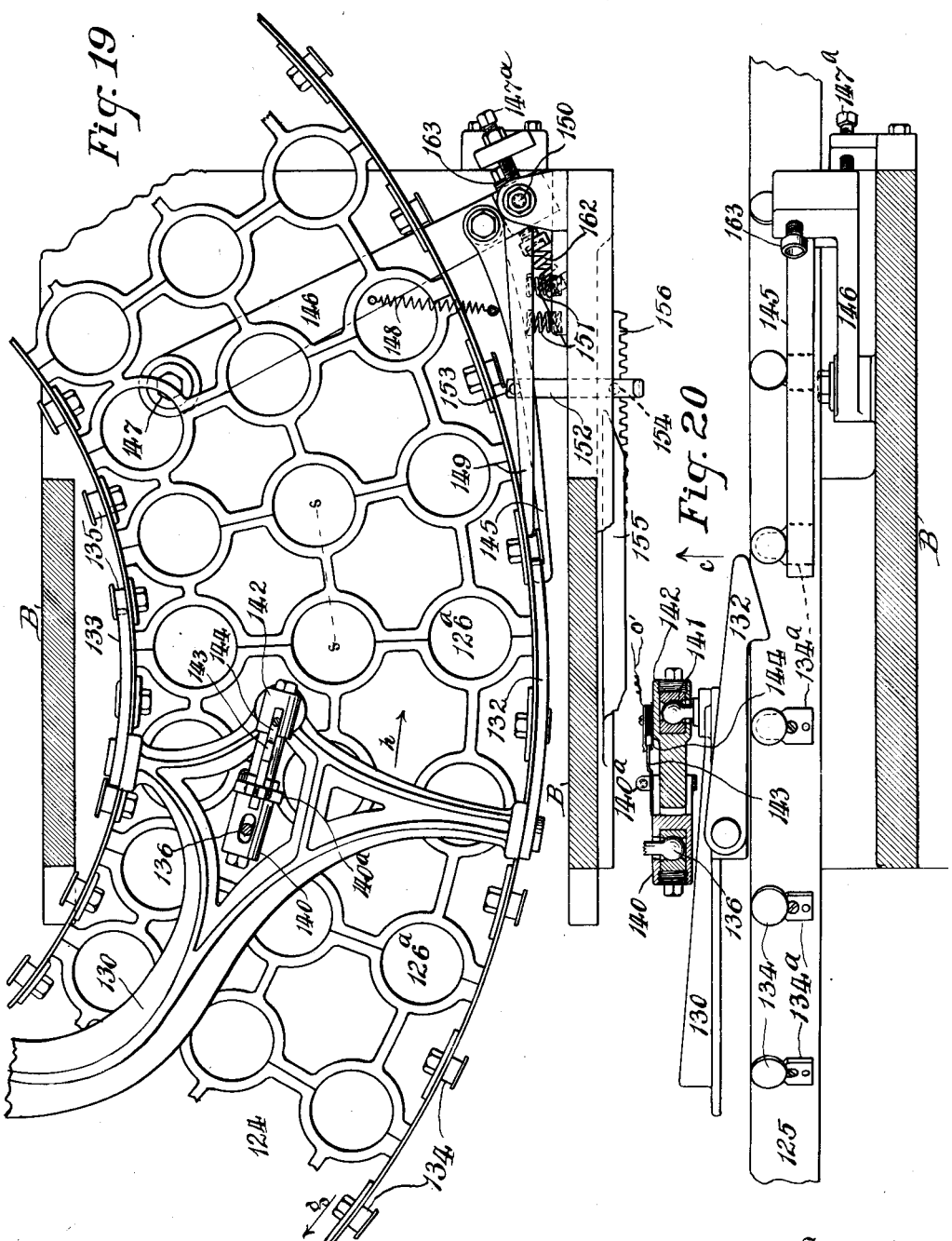

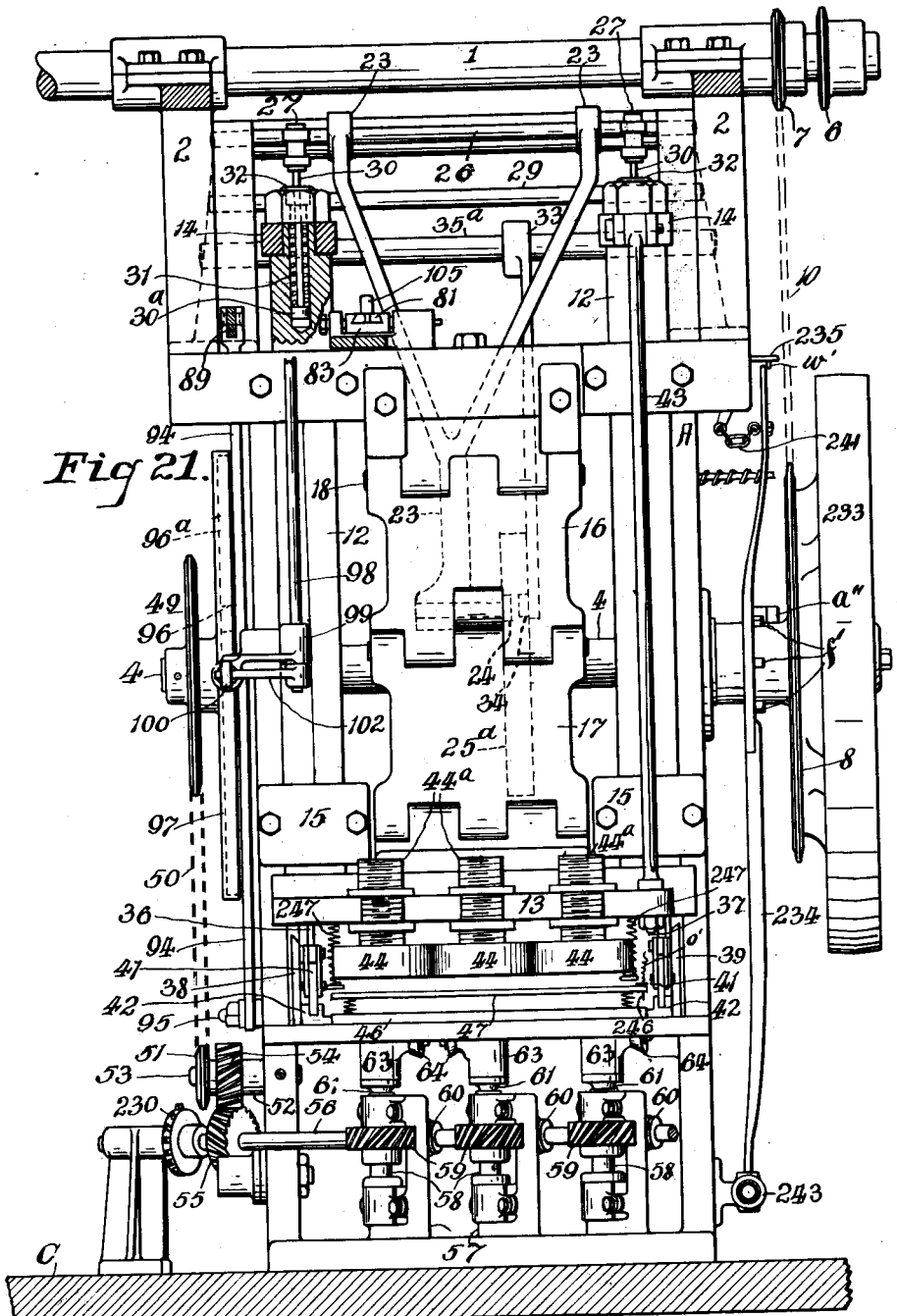

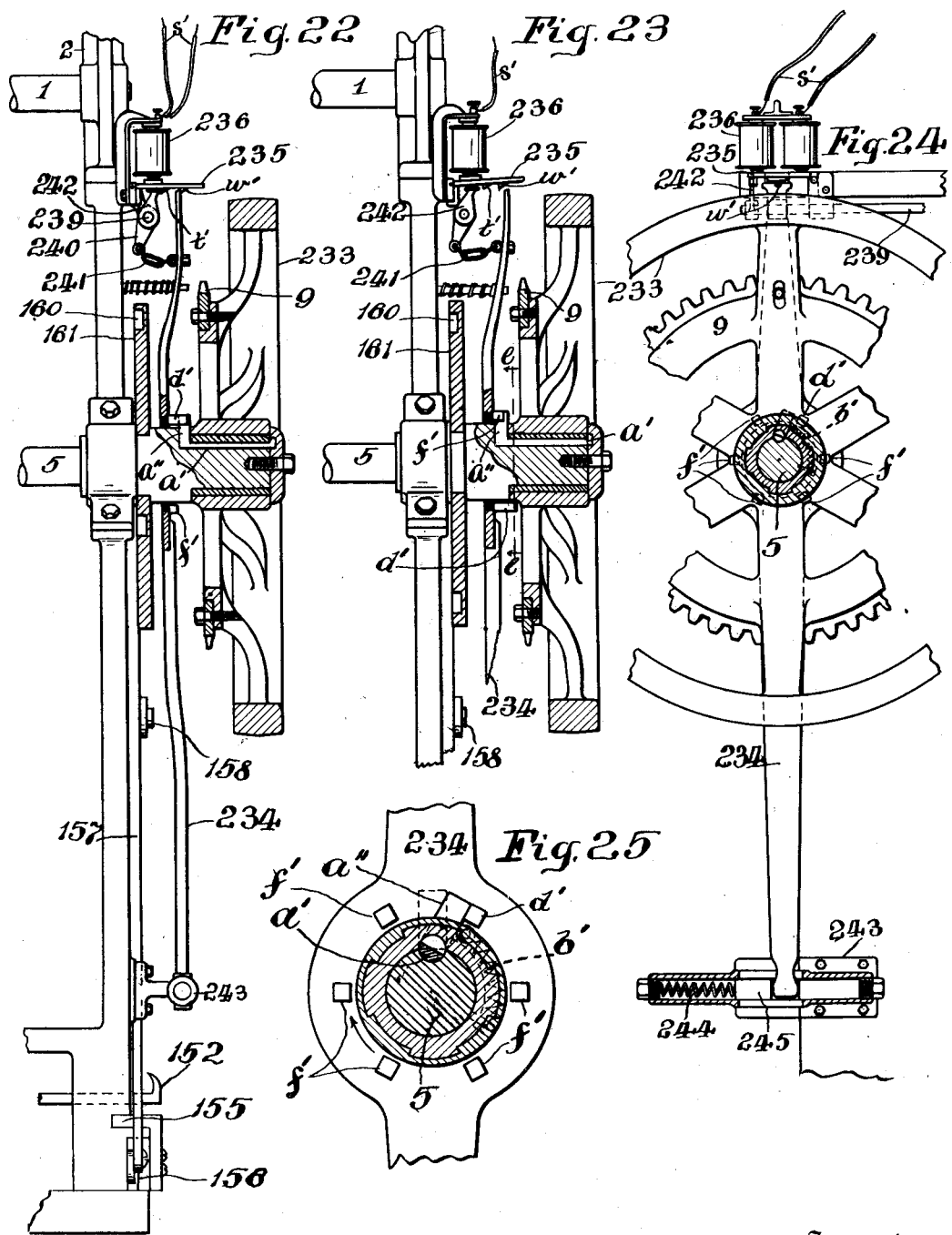

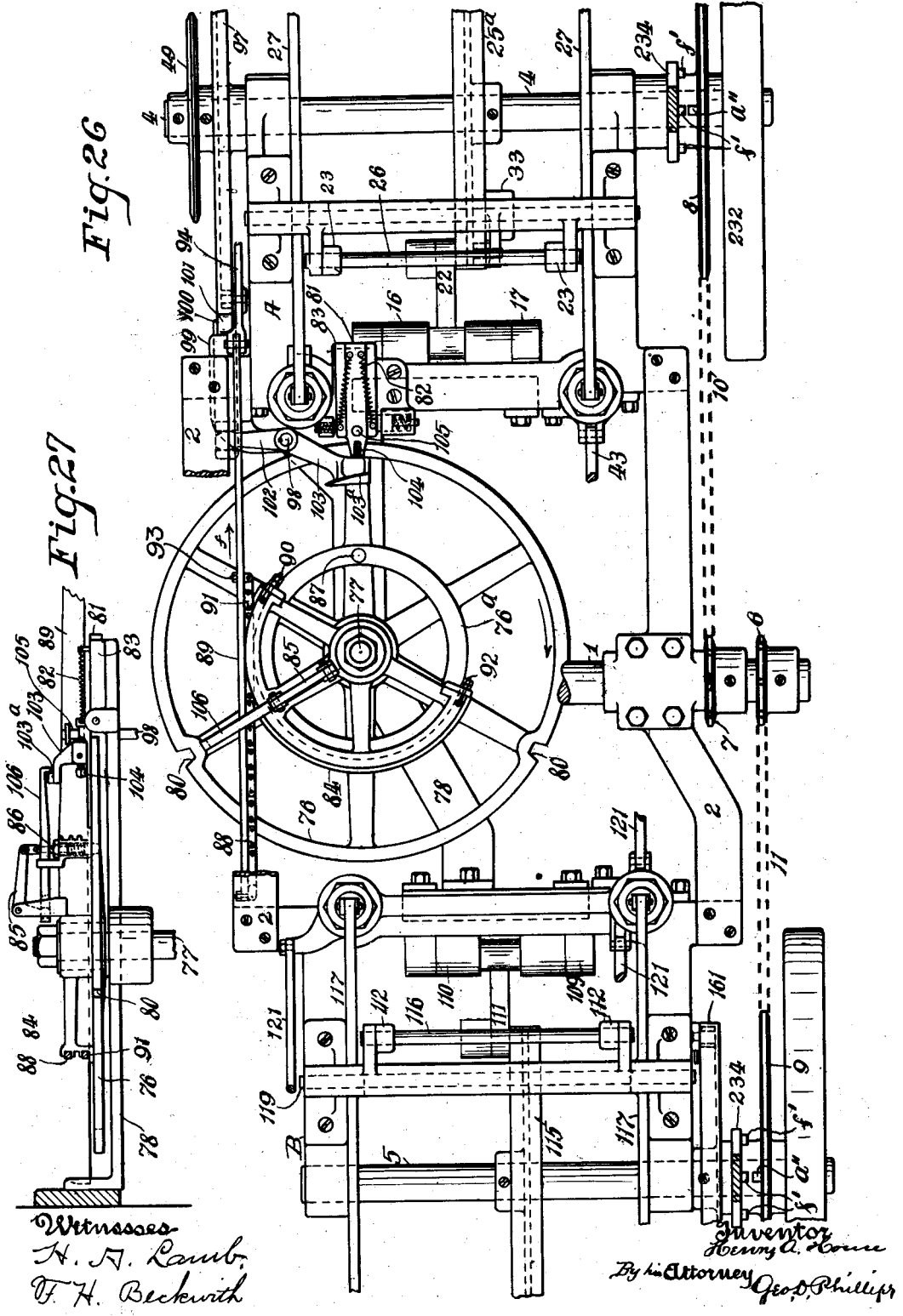

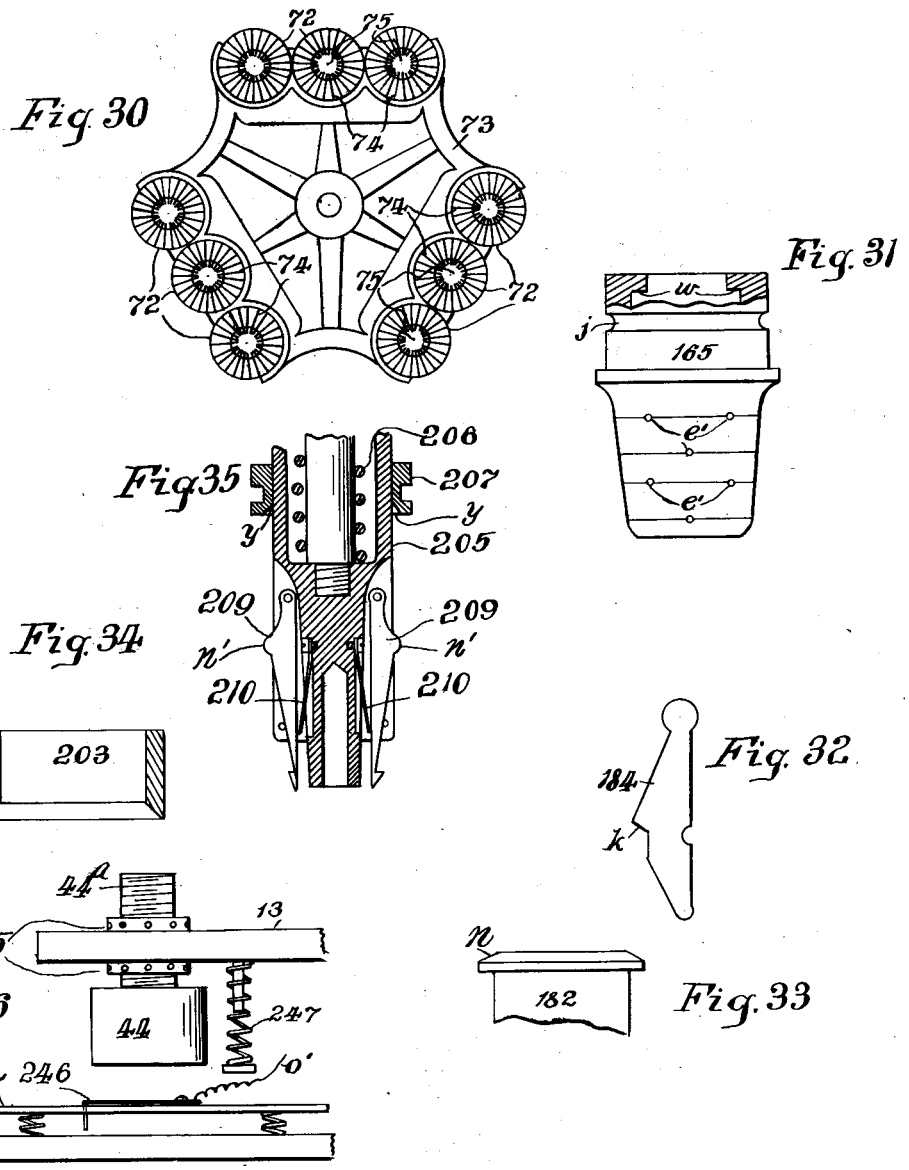

UNITED STATES PATENT OFFICE.

HENRY A. HOUSE, OF BRIDGEPORT, CONNECTICUT.

MACHINE FOR MAKING PAPER RECEPTACLES.

1,113,217.   Specification of Letters Patent.   Patented Oct. 13, 1914.

Application filed June 26, 1911. Serial No. 635,286.

*To all whom it may concern:*

Be it known that I, HENRY A. HOUSE, citizen of the United States, residing at Bridgeport, in the county of Fairfield and State of Connecticut, have invented certain new and useful Improvements in Machines for Making Paper Receptacles; and I do hereby declare the following to be a full, clear, and exact description of the invention, such as will enable others skilled in the art to which it appertains to make and use the same.

My invention relates to improvements in the manufacture of all and every kind of a paper vessel capable of being formed in a die.

The object of my invention is to construct a machine adapted to cut out a blank of paper and carry it through all the necessary operations to the finished article.

Figure 1:
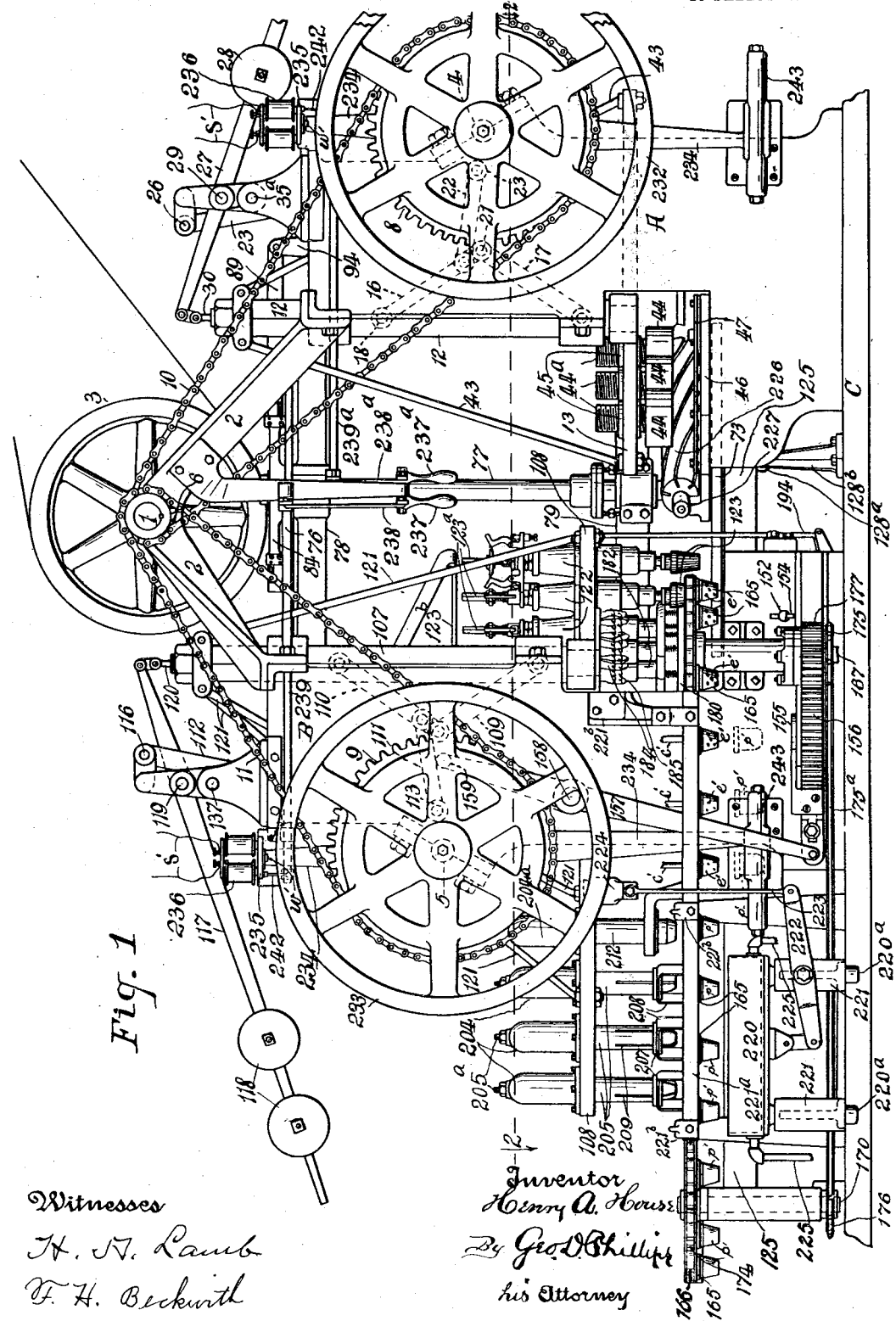
Figure 2:
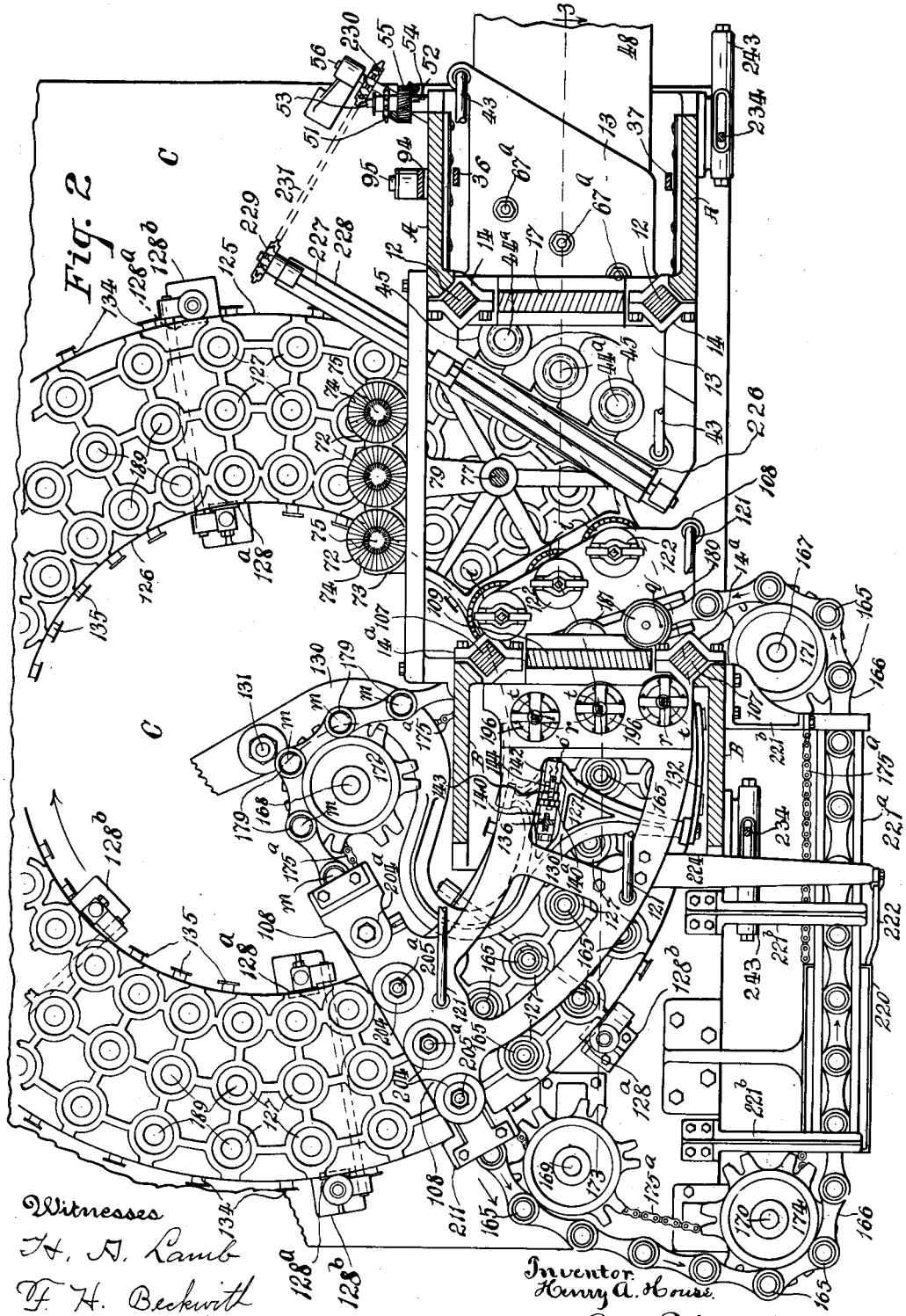
Figure 3:
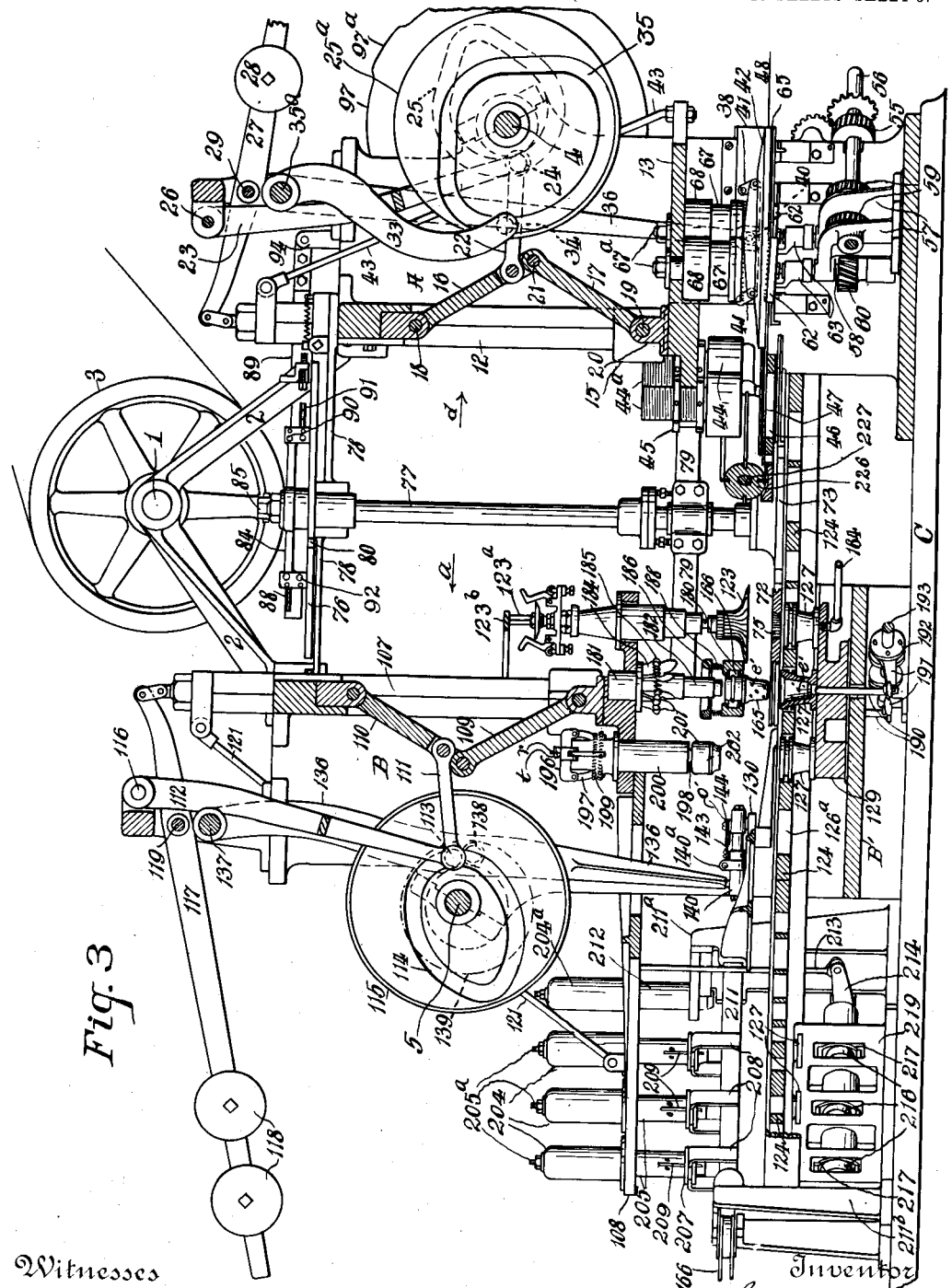

Referring to the drawings wherein the letters and figures of reference indicate like parts throughout the several views,—Figure 1 represents a side elevation of the machine showing one of the counter-weight levers and balance wheels broken away; Fig. 2 is a horizontal sectional view of the presses and gates of the machine on line 2 of Fig. 1; also broken upper plan view of the die conveyer; Fig. 3 is a vertical sectional view of the machine, partially broken, on line 3 of Fig. 2; Fig. 4 is a detail upper plan view of the die conveyer; Fig. 5 is a detail upper plan view of one of the units comprising the die conveyer with one of the dies therein, and broken view of the inside and outside binding irons for uniting the units together to form the conveyer; Fig. 6 is a side elevation of one of the die conveyer units with the binding irons or strips removed; also sectional view of a die. Fig. 7 is an enlarged full side elevation of two of the upper crimpers, broken sectional view of the third crimper, and broken sectional view of the gate in press A carrying the crimpers; Fig. 8 is an enlarged full side elevation of two of the lower crimpers and driving mechanism therefor, broken view of the crimper driving shaft, broken sectional view of the machine bed, and broken view partly in section of the third lower crimper; Fig. 9 is an enlarged broken view of the crimped paper strip; Fig. 10 is an enlarged broken sectional front elevation of the machine bed, sectional view of the bed and broken sectional view of the gate of the press B for forming the cup, broken sectional view of the punch conveyer, sectional view of the die conveyer, sectional view of dies therein, and broken view partly in section of the tools and mechanism for forming the cup looking in the direction of arrow *a* of Fig. 3; Fig. 11 is a view looking in the direction of arrow *b* of Fig. 10; Fig. 12 is an enlarged sectional elevation of press B, broken view partly in section of the tools for beading the rim or edge of a paper cup; Fig. 13 is an enlarged detail sectional elevation of a finished cup having a beaded rim or edge; Fig. 14 is an enlarged detail sectional elevation of a finished cup having a curved lip; Fig. 15 is an enlarged broken front elevation partly in section of the mechanism for extracting the punches from the dies in the die conveyer and removably locating them in the punch conveyer; Fig. 16 is a side elevation of Fig. 15; Fig. 17 is an enlarged broken upper plan view of the punch conveyer and its guide bracket to prevent the conveyer lifting when the punches are being extracted from the dies; Fig. 18 is an enlarged broken central sectional view of the punch vonveyer; Fig. 19 is an enlarged broken view of the die conveyer, a view of the indexing mechanism for the conveyer, broken view of the oscillating pawl carrying lever of the indexing mechanism, and sectional view of the side frames of the press B; Fig. 20 is an elevation of the mechanism shown in Fig. 19 looking in the direction of arrow *c*, with the side of the press B removed, but showing a sectional view of the bottom of said press; Fig. 21 is an enlarged front elevation of press A looking in the direction of arrow *d* of Fig. 3, showing part of the mechanism connected therewith sectioned and broken; Fig. 22 is an enlarged broken view partly in section of the clutch mechanism in its normal stopped position; Fig. 23 is a similar view showing the emergency stopped position; Fig. 24 is a front view of Fig. 23, broken view of the balance wheel rim, sprocket wheel, sectional view of the balance wheel hub and shaft on line *e—e* of Fig. 23; Fig. 25 is an enlarged broken view of the stop pin or emergency lever, and sectional view of the balance wheel hub on line *e—e* of Fig. 23; Fig. 26 is an enlarged upper plan view of the two presses and broken view of the machine frame showing the mechanism for indexing the plaiter dies, also showing a broken view of the driving shaft and other parts of the mechanism connected with the presses; Fig. 27 is an enlarged broken side elevation partly in section of the plaiter indexing mechanism; Fig. 28 is an enlarged side elevation of a part of the paper feeding mechanism and a broken view of its operating lever; Fig. 29 is an enlarged broken detail view of a section of paper showing the crimping; Fig. 30 is an enlarged detail upper plan view of the rotatable plaiter die carrier with the plaiter dies secured thereto; Fig. 31 is an enlarged detail broken view partly in section of one of the forming punches; Fig. 32 is an enlarged detail view of one of the locking fingers connected with the cup forming mechanism; Fig. 33 is an enlarged detail broken view of one of the plungers connected with the cup forming mechanism; Fig. 34 is an enlarged detail sectional view of the cup trimming cutter; Fig. 35 is an enlarged broken detail view partly in section of one of the punch extractors; Fig. 36 is an enlarged detail side elevation of one of the blanking dies, broken view of the press gate in which it is located, and broken view of the die plate and stripper plate.

1, Figs. 1 and 3, is the main driving shaft journaled in the machine frame 2 and carrying the driving pulley 3.

4 is a cam shaft for the press A, and 5 the cam shaft for press B. These shafts are continuously driven when the machine is in operation from the main driving shaft through the medium of the small sprocket wheels 6 and 7 thereon, and the large sprocket wheels 8 and 9 for driving the press shafts 4 and 5, which shafts are connected by the chains 10 and 11.

The construction of press A comprises the slides 12, Figs. 1, 2, 3 and 21, and the extended tool carrying gate 13 or other like movable support to which the lower end of the slides are secured. These slides are guided in the upper boxes 14, Fig. 2, and the lower boxes 15, Fig. 21, of the press frame.

16 and 17 are toggle arms, the upper end of the former is pivotally connected to the pin 18 located in a stationary part of the press, and the lower end of the latter is pivotally connected to the pin 19 in the bracket 20 secured to the gate 13, and the inner end of the arms are pivotally connected to the pin 21.

22 is a link connecting the toggle arms with the lower end of the branch lever 23 (see also Fig. 21), which lever carries the roll 24 operating in the cam groove 25, Fig. 3, in the vertical face of the cam plate 25ª on the shaft 4. The upper or branch ends of lever 23 are mounted on the rod 26 journaled in the machine frame.

The counterbalance levers 27, carrying the adjustable weights 28, are mounted on the rocker shaft 29 journaled in the machine frame.

30, Fig. 21, are rods whose upper ends are pivotally supported to the inner ends of the levers 27 and project freely into holes provided in the upper ends of the gate slides 12, and carry springs, one, 31, only being shown, which spring is located between the head 30ª of the rod and the inner end of the plug 32, so that when the gate descends the springs in the slides will be compressed to serve as shock absorbers on the return of the gate.

33, Figs. 3, 21 and 26, is a lever carrying at its lower end the roll 34 operating in the groove 35 formed in the face of the cam plate 25ª. The upper end of this lever is secured to the paper feeding rock shaft 35ª journaled in the machine frame.

36 and 37, Figs. 3 and 21, are paper feeding levers whose upper ends are secured to the rock shaft 35ª, and whose lower ends carry the paper feeding mechanism mounted on the slides 38 and 39 operatively located in the inner face of the sides of the press. The forked end of the levers embrace the roll 40, Fig. 28, mounted on the slide to which are also pivoted the upper end of the links 41, while their lower ends are pivoted to the shoe 42 adapted to be brought into contact with the edges of a paper strip to feed the same a predetermined distance.

43 are supporting braces connecting the horizontal portion 13 of the gate to the upper ends of the slides 12.

44, Figs. 1, 2 and 3, are three blanking punches mounted in the inner ends of the horizontal portion of the gate 13 and are vertically adjustable therein through the medium of their threaded shank 44ª and the nuts 45.

46 is the die plate secured to the bed of the press, and 47 is the stripper overlying the die plate between which die plate and stripper the paper strip 48 is fed. The crimping or creasing mechanism engages the paper strip before it reaches the blanking dies just described.

Referring to Fig. 21, 49 is a large sprocket wheel on the crank shaft 4 carrying the chain 50 to drive the smaller sprocket wheel 51 integral with the sleeve 52 rotatably mounted on the stud 53. This sleeve carries the spiral gear 54 meshing with the spiral gear 55 on the shaft 56 journaled in the standards 57, Figs. 3 and 8, in which are also rotatably journaled the short vertical shafts 58 carrying the spiral gears 59 meshing with the spiral gears 60 on shaft 56.

61, Fig. 8, are spindles in the ends of shafts 58 adapted to support the lower crimping dies 62 by a ball and socket joint connection as shown.

63 is a bracket secured to each spindle and carrying the bevel roller 64 adapted to travel on the incline spiral track 62ᵃ on the underside of each of the crimper dies. The rotation of the spindle carrying shafts 58, together with the rolls 64 and the spiral track 62ᵃ of the crimper dies, will impart an undulatory or rocking movement to the crimping dies for the purpose presently to be described.

65 is an overlying plate over which a paper strip is fed and having the holes 66 within which the crimpers operate.

67 are the upper crimpers carried by the horizontal portion 13 of the gate of press A, Figs. 2 and 3, through which their shanks 67ᵃ project. Referring to Fig. 7, these upper crimpers are yieldingly supported in the housings 68 by means of the springs 69. Both the upper and lower crimpers have the radially arranged steel blades 70 and the intermediately and radially arranged fiber blades 71, which fiber blades form anvils for the steel blades and thus avoid cutting the paper. The alternate arrangement of the steel and fiber blades will force each alternate crease r' in opposite directions as shown at Fig. 29. When the upper crimpers are brought down into working relation with the undulating lower crimpers, only a small portion of the blades of either set of crimpers will engage with the paper, owing to this rocking movement of the lower crimpers. This rocking feature is important, especially in crimping very heavy paper, as it will always insure a uniform crimp throughout the entire circle, which it would be extremely difficult if not impossible to secure such a result were the entire surfaces of both sets of crimpers brought in contact with the paper.

The crimps having been formed in the body of the paper as shown at Fig. 9, the paper is fed forward to bring said crimped portions under the before mentioned blanking dies where three circular blanks embracing the crimps are cut at one stroke of the press, and said blanks are deposited on one of the three sets of plaiting dies 72, carried by the rotatable carrier 73, Figs. 2 and 30, one set of which will always be under the blanking dies when said dies are brought into action. The plaiter dies or plaiter ring dies have the tilting and radially disposed fingers 74 and the central opening 75. The rotation of this plaiter ring die carrier to bring one set of plaiting dies under the blanking dies at the same time that a set is under the plaiters or plaiter heads presently to be described, is as follows: 76, Figs. 1, 3, 26 and 27, is an index wheel secured to the vertical shaft 77, which shaft is journaled in the upper bracket 78 and lower bracket 79 with the plaiting die carrier secured to the lower end of said shaft. The index wheel is located in its three positions by means of notches 80, Fig. 26, and the detent 81 normally held against the wheel by the springs 82 and is slidably mounted in the stationary chair 83. 84 is a segment swiveled on the hub of the index wheel 76 and carries the pivotally supported bell crank lever 85, to which lever is pivoted the downwardly spring actuated locking pin 86 adapted to register with any one of the three holes 87 in the inner rim 76ᵃ of the index wheel 76. 88 is a chain connecting the free end of the bar 89 with the bolt 90 in one end of segment 84, and the chain 91 is fastened to the bolt 92 in the opposite end of the segment and to the bolt 93 midway of the bar 89. The bar 89 is actuated to have a longitudinal movement through the medium of the lever 94 whose lower end is pivotally supported on the pin 95, Fig. 21, and is operatively connected by the roll 96 with the cam groove 96ᵃ, Fig. 21, in the vertical face of the cam plate 97 mounted on the cam shaft 4 of the press A. 98, Figs. 21 and 26, is a vertical rod whose lower end is journaled in the bracket 99. 100 is a slide mounted in this bracket carrying the roll 101 resting against the periphery of the cam plate. 102 is an arm secured to the lower end of the rod 98 whose free end engages the slide 100. The upper end of this rod carries the arm 103 in whose free end is located the adjusting screw 104 adapted to engage the pin 105 of the slide or detent 81 to force said detent back out of contact with the wheel 76 when the raised portion 97ᵃ, Fig. 3, of the cam plate 97 engages with the roll 101 of the before mentioned slide 100. When the index wheel 76 is released in the manner just described, the bar 89 will be actuated in the direction of arrow f, Fig. 26. This movement of the bar will, through its chain connection 91, and the engagement of the locking pin 86 with one of the holes 87, rotate the index wheel 76, shaft 77 and the plaiter die carrier 73. When the said carrier has been thus rotated one-third of a revolution, it will bring one of the notches 80 in the periphery of the index wheel 76 in position to be engaged by the detent 81. Just previous to such engagement, the hook end of the sliding bar 106, Fig. 27, will engage with the cam face 103ᵃ of arm 103 (see also Fig. 26) which will cause said bar 106 to move outward, and, as the other end of this bar is connected with one arm of the bell crank lever 85, Fig. 27, this forward movement of bar 106 will actuate said bell crank lever and cause the withdrawal of the locking or driving pin 86, which will take place simultaneously with the reëngagement of the detent 81. This will leave the segment 84 free to return to its normal position by the reverse movement of the bar 89. In the forward movement of said bar, the chain 88 was wound about the segment, while, as before mentioned, the chain 91 was unwound. In this reverse movement of the bar 89, the chain 91 will wind about the segment while the chain 88 will unwind therefrom. While the segment is being returned in the manner described, the spring actuated driving pin 86 will ride on the upper face of the inner rim 76ª until it arrives opposite a hole therein which it will enter in readiness for another turn of the index wheel.

The press B, Figs. 2 and 3, is constructed similar to the press A, having the slides 107 in boxes 14ª, horizontal gate 108 or other like movable support connected by the toggle arms 109 and 110 with the upper stationary part of the press.

111 is a link connecting the toggle arms with the lower end of the branch lever 112, which lever carries the roll 113 engaging with the cam groove 114 in the vertical face of the cam plate 115 mounted on the cam shaft 5. The upper branch ends of the lever 112 are journaled on the rod 116. The counterbalance levers 117 carrying the weights 118 are mounted on the shaft 119. The shock absorbing mechanism connecting the inner ends of these levers with the upper ends of the slides 107 is the same as that previously described for press A, one of the spring controlled rods, 120, Fig. 1, only being shown.

121 are brace rods supporting the gate to the slides.

122, Figs. 1, 2 and 3, are three plaiters mounted in the inner end of the gate 108. These plaiters, together with the plaiter dies 72, before described, being fully described in my former application, filed May 23d, 1910, No. 562,857, a further detailed description of them is unnecessary at this time. In Fig. 3 the plaiter fingers 123 are opened in readiness to engage a crimped blank on the plaiter dies, while in Fig. 1 the plaiter fingers are shown closed. The fingers are opened, Fig. 3, when the plaiter finger spindle 123ª strikes against the stop 123ᵇ. When one of the group of three plaiter dies are rotated by its carrier under the three plaiters 122, the gate will descend and force a crimped paper blank, overlying the plaiter dies, through said dies into three forming dies located in the die conveyer 124. This die conveyer, Figs. 4, 5 and 6, is, for convenience of construction, built up of the sections 124ª bound together by the external band 125, and the interior band 126. All of the openings 126ª of the conveyer are permanently filled with the forming dies 127 and are retained therein by the screws 128. The conveyer is mounted on the rollers 128ª, Fig. 2, carried by the standards 128ᵇ, supported on the bed C of the machine. This die conveyer is indexed to bring three of its dies onto the anvil 129, Fig. 3, for the operation of plaiting, forming and beading the rim of a cup, presently to be more fully described, as follows: Referring to Figs. 2, 19 and 20, 130 is a horizontally operated curved lever journaled on central support 131 and carrying the two pawls 132 and 133, the former adapted to engage the studs 134, Fig. 19, on the exterior of the conveyer, and the latter to engage with the studs 135 on the interior of said conveyer to pull said conveyer a distance equal to the distance between the center of one row of die openings, 126, which die openings are supposed to be filled with forming dies, to the other row of said openings, or, in other words, from s to s. The horizontal lever 130 is actuated by the vertical lever 136, Fig. 3, whose upper end is journaled on the rod 137. 138 is a roll carried by this lever which engages with the cam groove 139 in the rear vertical face of the cam plate 115. The lower end of this lever, Fig. 20, forms a ball and socket connection with the carrier 140. 141 is a ball projecting from the horizontal lever 130 which forms a ball and socket connection with the other part of the carrier 142. The clamped end 140ª of the carrier 140 frictionally connects these two carriers together with a grip sufficient to enable the lever 136 to normally operate the horizontal lever 130. 143 is a thin metal strip on carrier 140 that separates the spring armatures 144 on the carrier 142 so that, should the rotatable forming die conveyer 124 meet with any obstruction liable to break the lever 136, or do any damage to any other part of the mechanism connected with the die conveyer, the extra strain on said lever will slip the frictional connection between the carriers 140 and 142 far enough to disconnect the metal strip 143 and allow the armatures to spring together and close an electrical circuit, and stop the machine. 145, Figs. 19 and 20, is a recoil stop lever to locate the die conveyer in operative position by having its free hook end engage with the square base portion 134ª of the studs 134 of the conveyer. This lever is pivoted to lever 146, which, in turn, is pivoted to the stud 147. Lever 145 is normally held against the outer rim of the forming die conveyer by the spring 148. 149 is a dead stop lever pivotally supported on the bolt 150 located in a stationary part of the press B, and is normally held against the outer rim of the conveyer by the springs 151. 152 is a sliding bar carrying on its inner end the pin 153 to engage the inner face of the lever 145, while the end of the bar projecting through the machine frame carries the pin 154, seen also at Fig. 1. The taper end of the slide bar 155, which bar is secured to the rack 156, is adapted to engage this pin and draw the lever 145 out of engagement with the forming die conveyer 124 for the purpose presently to be described. The slide bar 155 and rack are actuated by the lever 157, Figs. 22 and 23, pivoted on the stud 158, the upper end carrying the roll 159, Fig. 1, to engage with the groove 160 in the cam plate 161 mounted on shaft 5. The simultaneous movement of levers 136, Figs. 3, 19 and 20, and lever 157, Fig. 1, will carry the curved horizontal lever 130 and the slide 155 in the direction of arrow $h$, Fig. 19, both to retreat lever 145 and to bring the pawls 132 and 133 of lever 130 over two of the studs of the die conveyer. The return movement of lever 130 will carry said conveyer the required distance in the direction of arrow $g$. The retreat, at the same time, of the slide 155, will release lever 145 and allow it to spring back against the outer rim of the conveyer in readiness to engage with the base 134$^a$ of one of the conveyer studs as soon as the pawls of lever 130 have embraced said studs. The instant said pawls are in place, the free end of lever 149 will have dropped back of the stud engaged by the pawl 132 to prevent the retreat of the die conveyer. As there is considerable momentum in the die conveyer when the lever 145 takes hold to locate said conveyer, it would cause a shock by its sudden stoppage, but for the shock absorbing spring 162 located in the end of the adjusting screw 163 carried by the lever 146. 147$^a$ is an adjustable stop screw against which the lever 146 will rebound and rest when the die conveyer is at a standstill. When the plaiter die carrier 73 has rotated a group of three plaiter dies under the plaiters 122 with the circular paper blanks $i$ overlying the dies as shown at Fig. 2, the gate 108 will descend with said plaiters and force the blanks through the plaiter dies into three forming dies carried by the die conveyer 124, which dies, at the time, will be resting upon the anvil 129. The plaiters will then retreat and leave the plaited cups in said dies, which dies will be advanced by the die conveyer to the next position presently to be explained. To prevent the plaited cups being drawn out of the dies when the plaiter carrier starts to rotate, the cups are held in their dies by air suction. A small opening is provided in the bottom of each forming die and holes are provided in the anvil at the point that the forming dies will rest when the plaiters are operating, and pipes communicating with said holes in the anvil and an air exhaust pump (not shown) will hold the cups in the dies by suction while the dies remain under the plaiters, one of said pipes, 164, only being shown at Fig. 3. The next turn of the die conveyer will bring the dies containing the plaited cups, just described, under the forming punches 165 removably located in the opening $m$ of the punch conveyer 166. This conveyer is intermittently rotated to bring three punches into position to enter three dies containing the plaited cups as follows: Referring to Figs. 1 and 2, 167, 168, 169 and 170 are vertical shafts carrying at their upper ends the sprocket wheels 171, 172, 173 and 174, the latter serving as an idler or tightener. The lower ends of these shafts also carry sprocket wheels, two, 175 and 176, only being shown at Fig. 1. 175$^a$ is the drive chain for said shafts. The rack 156 engages the pinion 177 on the lower end of shaft 167 so that when the lever 157 is actuated to actuate the slide 155, before described, it will also actuate the forming punch conveyer the proper distance required. The punches are removably secured in the conveyer by means of the wire spring clips 179, Fig. 17, located in the openings $m$ of the conveyer adapted to engage the groove $j$, Fig. 31, of each punch. 180, Figs. 1, 2, 3, 10 and 11, is a stationary guide support for the punch conveyer and is located in rear of the plaiters and over the die conveyer.

The manner of forcing the punches out of their conveyer and into the dies containing the plaited cups is seen more clearly in the enlarged views shown at Figs. 10 and 11. 181 are three plunger holders secured to the underside of the press gate 108, and 182 are combined plungers and punch ejectors operatively mounted in these holders and are backed up by the springs 183, one only of said springs being shown. 184 are locking fingers pivotally supported in the plunger holders and have the lip $k$, Fig. 32 adapted to normally rest on the tapered rim $n$, Fig. 33, of the upper end of the plungers, and are normally and removably held thereagainst by the springs 185. When the gate 108 descends, the shoulders $o$ of the plungers contact with the top of the punches and force said punches out of their conveyer when they will drop into the plaited cups $p$ within the dies 127 resting on the anvil 129, which anvil is secured to the bottom B′ of the press B. The plungers follow up the punches as the gate descends to give the required pressure to the cups. Should, however, the dies not be directly under the punches so that the plungers will meet with a resistance liable to do damage to the mechanism connected with the process of forming the cups, the fingers 184 will be forced outward by the reverse movement of the plungers and the springs 183 back of said plungers will absorb the shock due to the resistance the plungers may have met with. The wires $q$ are connected to the plungers and are part of an electrical circuit so that immediate notice is given of the trouble and where to locate it. If the plungers meet with no obstruction, the engagement of the fingers with the plungers will be sufficient to carry the plungers down and dislodge the punches, and before the ends of said plungers again contact with the dies to effect the necessary pressure, the lower ends of the fingers will have entered the mouth of the depressible locking rings 186 which will effectually prevent their becoming unseated from the upper ends of the plungers when the final pressure is applied. The locking rings are located on the punch conveyer support or guide by the bolts 187 and springs 188 so that said rings will follow down with the gate of the press. Previous to the dislodgment of the punches from their conveyer, the plaited cups are partially unseated or lifted up a short distance in order that the punches may be well seated in the cups before the final pressure is applied. By this arrangement, the pressure is applied equally over the whole surface of the cups, whereas, if the cups were seated in the dies when the punches entered therein, the pressure would be applied first at the mouth of the cups which would have a tendency to distort or draw the paper at that point. The partial and temporary unseating of the plaited cups is effected as follows: 189 are movable die bottoms, and 190 are plungers vertically operating through the base B' of the press and the anvil 129 as shown at Fig. 10 and having the tapered end 190ª adapted to enter the taper hole 189ª in the lower end of these bottoms, so that said bottoms may be accurately seated when the plungers 190 are retreated. The lower ends of these plungers are (see also Fig. 11) pivotally connected with one end of the levers 191 whose opposite ends are held in frictional contact between the plates 192 mounted on the shaft 193, which shaft is controlled and actuated by the gate 108 through the medium of the connecting rod 194, seen also at Fig. 1. When, therefore, all three of the cups have been lifted up as shown by the center one of the three cups in Fig. 10, the dies will drop into said cups, and when the plungers 182 descend and reengage the punches to effect the necessary pressure, the bottoms 189 and the plungers 190 will also be carried down by reason of the frictional support of said plungers 190. The adjustable set screw 195, Fig. 11, will regulate and limit the distance that the plaited cups are lifted.

The next operation connected with the cup is forming the bead $v$ on the rim as shown at Fig. 13, or trimming the rim when the cup has the outward curved lip $v'$ as shown at Fig. 14. The three heading or trimming tools, Fig. 12, are carried by the gate 108 and are located immediately back of the cup forming tools just described. These headers comprise the head portion 196 to which are pivotally supported the fingers 197, whose lower curved edges $m'$ are normally held in contact with the top edge of the plungers 198 by the springs 199. The outer shell or housing 200 is secured to the press gate 108 and to the head 196. 201 is a header cap which floats on the lower end of the plunger and is maintained there by the wire $r$ headed over at the lower end and having the nuts $t$ at the upper end. The header ring 202 is fitted snugly to the mouth of the cap 201. The dies shown at Fig. 12 have the recessed mouth $u$ which is entered by the header to form the bead $v$, Fig. 13, on the cup P' while the cups P previously described have a curved lip as shown at Fig. 14. The dies for the beaded and curved lip cup may be made exactly alike except the recessed mouth. The engagement of the fingers 197 with the upper end of the plunger, combined with the inward pressure of the springs, is sufficient to effect the beading or trimming of the cup, but any undue resistance that would result in damage to the tools would dislodge the fingers and allow the extra pressure to be absorbed by the spring 202'. In utilizing these tools for trimming the edge of the curved lipped cup, Fig. 14, the header ring 202 is removed and the ring cutter 203, Fig. 32, is substituted therefor. The right hand header tool is shown in the act of forming the bead on the cup. In actual practice it will be understood that all three tools will be carried down by the gate at the same time. It will also be understood that when mention is made of the headers, it implies the trimming feature whenever the trimming ring is substituted for the header ring.

After the operation of heading or trimming just described, the next operation will be to extract the punches from the dies with the paper cups adhering thereto. The same number of extractors are employed as there are plaiters and headers. These extractors comprise the housings 204, Figs. 1, 2, 3 and 15, secured to the rear portion of the gate 108.

205 are plungers slidably mounted in the housings and are backed up by springs, one only, 206, being shown. These plungers also slide through the rings 207 secured to the brackets 208.

209 (see also Fig. 35) are hook fingers pivotally supported on the plungers and are normally forced outward a predetermined distance by the springs 210. When the gate descends, the end of the plungers will enter the mouth of the punches, as seen at Fig. 15, far enough to allow the hook end of the fingers to spring out and engage the lip $w$, Fig. 31, of the punches, and on the return stroke of the gate the punches are lifted out of the dies and reseated in the punch conveyer. As soon as the punches are thus seated, the projections $n'$, Fig. 35, of the fingers will engage the incline $y$ of the rings 207 and release the fingers from contact with the punches while the gate is returning to its upper normal position. While the punch conveyer is under the extractors it is also located in the stationary guide 211, Fig. 17, which guide is supported on the standards 211ª and 211ᵇ and is intended to keep the punch openings or seats in alinement with the extractors, and also to prevent springing up of the conveyer when the punches are drawn up and seated therein. This guide also supports the ring supporting brackets 208.

204ª, Fig. 15, is a housing similar to the extractor housings and it carries the plain locating plunger 212 guided in the standard 211ª, so that, in case the seats $m$ of the punch conveyer do not aline with the punches in the die conveyer, this locating plunger will first enter an empty punch seat of the punch conveyer and rectify any errors of alinement by drawing the punch conveyer into position both for the punch extractors to reseat the forming punches in their conveyer at one end of the press gate, and ejecting them therefrom into the forming dies at the other end of said gate.

As before mentioned, the finished cups adhere to the punches when said punches are taken out of the dies. To insure this adherence and also to assist the extractors so as not to put too much strain on the extractor fingers, the following mechanism is employed: Referring to Figs. 15 and 16, 213 is a connecting rod pivotally supported to the gate 108 and to the crank collar 214 on the shaft 215, carrying the cams 216. 217 are yokes embracing these cams in which are journaled the rolls 218 to engage with said cams. The upper or spindle ends 217ª of these yokes are adapted to contact with the underside of the die bottoms 189 so that the instant the press gate starts to retreat with the extractors, the spindle ends 217ª will at the same time assist the extractors in withdrawing the punches from the dies and maintaining contact between the punched cup and said punches. The standard 219 in which the shaft 215 is journaled also affords a temporary support for dies while under the punch extractors. After the punches with the cups are located in the punch conveyer, said conveyer is again advanced to repeat the operation of extracting three more punches and the three previously extracted are carried step by step toward the front of press B to meet the dies in the die conveyer again where the operation of pushing the punches out of said conveyer into the dies again is repeated.

Between the point where the punches are extracted from the dies and seated in their conveyer, and the point where they are unseated and forced into the dies, the paper cups are paraffined and discharged from the punches as a finished product, as follows:

Referring to Figs. 1 and 2, 220 is a paraffin tank having the depending studs 220ª adapted to have a vertical movement in the standards 221 through the medium of the rocking lever 222 and the connecting rod 223, which rod connects one end of said lever with the outer end of the arm 224 secured to the gate 108 so that, when the gate descends the tank 220 will be carried up and the punches with the cups are submerged therein. Any well known means may be employed to heat the paraffin; in Fig. 1 gas pipes 225 are shown for this purpose. 221ª is a guide, Figs. 1 and 2, supported by the brackets 221ᵇ for the punch conveyer while the same is over the paraffin tank and a short distance beyond. $c'$ are pipes through which a current of air will be forced into the open mouth of the punches as soon as they reach this point and eject three finished cups as shown dotted, leaving the punches free to reënter the dies. It will be observed in the several views where the punches are shown, and particularly Fig. 31, that the air passages $e'$ are provided in the sides of the punches communicating with the interior through which the air is forced directly against the bottom and interior sides of the cup for the purpose above described.

Referring to Figs. 1, 2 and 3, 226 is a rotary cutter on shaft 227 journaled in the standard 228. This shaft carries the sprocket wheel 229 and is rotated from the sprocket wheel 230 on shaft 56 through the medium of the chain 231. This cutter runs close to the inner edge of the blanking die plate 46 for the purpose of destroying the paper scrap by cutting it up into very fine particles which can then be carried away by air suction or in any other suitable manner.

The balance wheel 232 on the cam shaft 4, and the balance wheel 233 on shaft 5 being actuated by the same mechanism to start and stop the gates of the two presses A and B, and also the emergency stops, such mechanism will be designated by the same reference characters.

Referring to Figs. 21, 22, 23, 24 and 25, 234 are emergency stop levers connected with the clutch mechanism of each of the presses. Referring particularly to Figs. 22, 23, 24 and 25 which show the clutch mechanism connected with press B which, as before mentioned, is a duplicate of the mechanism of press A, the stop lever 234 is journaled on an enlarged portion of the cam shaft 5. $a'$ is an ordinary half round clutch pin located in a semi-circular seat in the shaft so that, when the pin is turned, Fig. 25, so as to be engaged by the hub of the balance wheel, the cam shaft will be rotated, and when the corners of the pin coincide with the periphery of the shaft, the balance wheel will run freely on the shaft. The spring $b'$ normally holds the clutch pin in engagement with the balance wheel hub. The rear angular portion $a''$ of the pin projects through the balance wheel hub to be engaged by the stop pins $d'$ and $f'$ in the manner and for the purpose presently to be more fully described. 235 is a pivotally supported armature and 236 are magnets therefor, and $s'$ are wires connecting these magnets with a storage battery (not shown). $w'$ is a long catch and $t'$ a shorter one on the underside of the armature adapted to be engaged by the upper end of the emergency lever 234. The normal running position of lever 234 is back of the short catch $t'$, and is located there through the medium of the handle 237, Fig. 1, vertical rod 238 and horizontal rod 239 whose arm 240, Figs. 22 and 23, is connected to said lever by the links 241. The handle $237^a$, rods $238^a$ and $239^a$, Fig. 1, perform the same office for the clutch mechanism connected with press A. 242 is a cam lever carried by these horizontal shafts for the purpose of manually operating the armatures of the magnets. To manually stop the machine, the cam lever 242 is actuated to lift the armature sufficient to unlock lever 234 from the short catch $t'$ and permit it to spring outward against the long catch $w'$, Fig. 22. This outward spring of said lever 234 will advance the stop pin $d'$ in the path of the revolving projecting end $a''$ of the clutch pin $a'$ and stop the movement of one or both presses as the case may be. All of the moving parts connected with the formation of the cups are electrically connected in the same circuit with the magnets so that, should any of said moving parts meet with any obstruction liable to cause damage thereto, or to the product, the armatures are instantly brought in contact with the magnets. This upward movement of the armatures will be sufficient to not only unlock the end of the stop lever from the short catch $t'$, but will also carry the long catch $w'$ out of the path of the outward springing lever as shown at Fig. 23. This will permit said lever to spring out far enough to bring any one of the many short stop pins $f'$ in contact with the clutch pin and instantly stop the machine. To absorb the momentum of the press by this sudden stoppage, the lower end of this emergency lever is controlled by the shock absorber comprising the casing 243, spring 244 and plunger 245.

All of the essential moving parts are electrically connected so that, if any one of the different tools or parts meet with undue resistance liable to effect damage, the entire machine will instantly stop, and a bell (not shown) will sound the alarm and the exact tool or part that met with trouble will be accurately located. For instance, 246, Fig. 36, is a spring contact finger projecting through the combined stripper and presser plate 47 overlying the die plate 46 and is attached to said plate and insulated therefrom. When, therefore, the gate 13 descends with the punch 44, the spring 247 will force down the yielding plate 47 against the paper being fed to the punches. If the paper is being properly fed, the finger 246 will contact with the paper and said paper will form an insulation. But should there be no paper under the punches, the finger will contact with the die 46 or other metallic part of the machine and close the circuit, ring a bell, and the machine will instantly stop in the manner before mentioned. In Fig. 15 will be seen the manner of placing the punch extractors in the electrical circuit. D are insulation washers secured to the spindle $205^a$ of the punch extractors as well as the spindle $205^b$ connected with the locating plunger 212. The spring contact points $h'$ normally rest against these insulations when the extractors are working properly, but should any of these extractors or the plunger meet with undue resistance, their spindles would be forced up and allow electrical contact to be made by the point $h'$ contacting with the point $h''$. On the rear of the punch conveyer guide 211, Figs. 16 and 17, is located the contact fingers $k'$ $k''$. The lower spring fingers are intended to lie in the path of the revolving dies and above the same, but close enough to engage with a punch that by accident may not have been removed by the extractors and form thereby an electrical contact and cause the machine to stop. The engagement between the vertical lever 136 and the horizontal lever 140, Fig. 19, is such, as before described, that any strain above the normal will close the electrical circuit and bring the machine to a standstill. The spring controlled fingers $u'$ $u''$, Fig. 12, are carried with the gate 108 under normal working conditions, but should the headers meet with a resistance above the normal, the wires $r$ will be instantly forced up with the plungers 198 and close the circuit. In Fig. 10 the wires $q$ act in a manner similar to wires $r$ by engaging with spring contact fingers (not shown) to effect the same result. All of the moving parts of the machine that are liable to suffer damage by abnormal strain are similarly placed in the electrical circuit. All of the wires $o'$ which are connected with the several electrodes run to annunciators (not shown), while the magnets connect, as previously mentioned, with a storage battery (not shown).

The operation of the machine is as follows: The paper is fed from a reel or other source of supply (not shown) into the press A, where three sets of crimps are made in the body of the paper, and the paper fed to the blanking tools where the crimped blanks fall or are forced onto three plaiter dies always underneath the blanking tools when said tools are in operation. The rotation of the plaiter die carrier will place the blanks under the overlying plaiters or plaiter heads in the gate of press B. The downward stroke of the gate will force the blanks through the plaiter dies and deposit plaited cups into the dies of the rotating die conveyer and leave them there. The next intermittent movement of the die conveyer will bring the plaited cups under the forming punches held suspended, as before mentioned, in their intermittently traveling conveyer. The punch ejector plungers will then descend and unseat the punches which will drop into the plaited cups in the dies, which cups, as before mentioned, have been slightly unseated before receiving the punches. The unseating plungers follow immediately and apply the necessary pressure to firmly lay the plaits and properly shape or form the cup. The next rotative movement of the die conveyer—with the punches still seated in the dies—will bring the formed cups under the heading or trimming tools, as the case may be, where the next operation on the cups is performed. The dies with the punches and cups therein are then advanced under the punch extractors which descend and extract the punches from the dies and reseat them in the punch conveyer which carries them under the punch ejectors to be again unseated. When the punches are extracted from the dies the cups will adhere to them, as before mentioned, until they have been blown off after the paraffin has been applied. The gates of the two presses move in unison, so that, when under full working condition, there will be three crimps formed in the paper strip, three blanks cut, three cups plaited, three forming punches extracted and force applied thereto, three cups headed or trimmed and three completed cups paraffined on the downward stroke of the two presses, thus moving in unison, and three forming punches extracted and reseated in their conveyer on the upward stroke. The air pressure required to blow the finished cups from the punches may also be actuated by the downward stroke of the gates or in any other suitable manner required.

In the drawings two presses carrying the necessary tools to make a complete cup only are shown, but it will be understood that duplicate presses equipped with similar tools could be added to this system, and would be located directly opposite the present ones, and adapted to operate in harmony therewith and with the intermittent travel of the horizontally operating die conveyer, in which case there would be double the capacity or product. Where four presses are employed, the horizontally operating lever 130, Fig. 2, for rotating the die conveyer, will extend under the additional presses and perform the same function at the same time in rotating the die conveyer as it does for the presses A and B.

I do not wish to be confined to the exact details of construction of the several parts of the machine, as these may be changed or substituted for others equally capable of performing the necessary functions for which the machine is designed. In some cases, especially where very thin paper is used, the crimpers might be dispensed with.

While I show the present machine constructed to produce cups in triplets, it will be understood that the number could be increased by simply enlarging the die conveyer and increasing the number of operating tools.

Having thus described my invention, what I claim is:—

1. In a machine of the character described, comprising an intermittently rotatable conveyer, cup forming dies therein, paper blanking punches and dies, an intermittently rotatable carrier underlying the blanking dies, plaiter dies mounted on the carrier adapted to receive a paper blank, and plaiters adapted to force the paper blank through the plaiter dies into the forming dies.

2. In a machine of the character described comprising intermittently movable cup forming dies, intermittently movable plaiter dies overlying the forming dies, and plaiters overlying the plaiter dies, adapted to force a paper blank through the plaiter dies and deposit a plaited blank into the forming dies.

3. In a machine of the character described comprising intermittently movable cup forming dies, intermittently movable plaiter dies overlying the forming dies, plaiters overlying the plaiter dies, adapted to force a paper blank through the plaiter dies and deposit a plaited cup into the forming dies, and means for temporarily retaining it there while the forming dies are passing from under the plaiter dies.

4. In a machine of the character described comprising an intermittently rotatable forming die conveyer, forming dies mounted therein, an intermittently traveling punch conveyer overlying the die conveyer, cup forming punches removably located therein, means for ejecting the punches from their conveyer into the dies, means for applying pressure thereto, and means for extracting them therefrom and reseating them in the punch conveyer.

5. In a machine of the character described comprising a forming die conveyer, forming dies therein, an overlying traveling punch conveyer, cup forming punches removably seated therein, means for ejecting the punches from their conveyer into the dies at one point or station, means for applying pressure thereto, and means for extracting the punches from the dies and reseating them in the die conveyer at another point or station.

6. In a machine of the character described comprising a traveling cup forming die conveyer, an overlying traveling punch conveyer, cup forming punches removably located therein, mechanism for ejecting the punches into the dies, means for applying pressure thereto, and mechanism for extracting them therefrom and reseating them in the punch conveyer.

7. In a machine of the character described comprising a traveling forming die conveyer, cup forming dies therein, an overlying traveling forming punch conveyer, punches removably located therein, movable punch ejectors adapted to unseat the punches into the dies and follow them up with the required pressure.

8. In a machine of the character described comprising a traveling die conveyer, forming dies therein, an overlying traveling conveyer, forming punches removably located therein, movable punch ejectors adapted to unseat the punches into the dies and follow them up with a final pressure, means for releasing said ejectors when meeting undue resistance, and means for locking said ejectors against release when the final pressure is being given.

9. In a machine of the character described comprising a traveling forming die conveyer, a traveling forming punch conveyer, forming punches removably located therein, movable punch ejector plungers, a support therefor, locking fingers adapted to hold the plungers under normal pressure and release the plungers when meeting undue resistance, depressible locking means for said fingers to prevent release of the plungers when under final pressure.

10. In a machine of the character described comprising a die conveyer carrying forming dies, an overlying punch conveyer, forming punches removably located therein, plungers adapted to eject the punches from their conveyer into the dies and apply pressure to the ejected punches, and means for temporarily unseating paper cups in the dies before the entrance of the punches.

11. In a machine of the character described comprising forming dies adapted to hold unfinished paper cups, forming punches, means for bringing the punches into the dies and applying pressure thereto, and yielding means for temporarily unseating the cups a predetermined distance before the entrance of the punches.

12. In a machine of the character described comprising a traveling die conveyer carrying paper cup forming dies and punches, an overlying traveling punch conveyer, movable punch extractors adapted to remove the punches from the dies and reseat them in the punch conveyer with the cups adhering thereto, and means for unseating the cups from the dies when the punches are being extracted.

13. In a machine of the character described, a paper cup forming die carrier, a paper cup forming punch carrier, movable punch extractors, means for depositing the punches into the dies of the die carrier, movable bottoms for the dies, the extractors adapted to engage the punches in the dies and reseat them in the punch carrier with the paper cups adhering thereto, and means for unseating the cups through the medium of the movable bottoms when the punches are being extracted.

14. In a machine of the character described comprising a paper cup forming die conveyer, an overlying punch conveyer, paper cup forming punches removably located therein, punch ejector plungers, the dies having central openings, movable bottoms seated therein, yielding means for engaging the bottoms and temporarily unseating the same and the paper cups before the punches engage therewith, and means for maintaining the bottoms in alinement with their seats.

15. In a machine of the character described comprising a conveyer, paper cup forming dies located therein, an overlying conveyer, paper cup forming punches removably located in the second named conveyer, punch ejector plungers for dislodging the punches from their conveyer into the dies and applying pressure thereto, and an anvil under the dies to withstand the pressure of said plungers.

16. In a machine of the character described, a traveling conveyer, dies located therein, cup forming punches in the dies with interposed cups, a traveling punch conveyer, movable punch extractors adapted to extract the punches from the dies and removably seat them in their conveyers with the cups adhering thereto.

17. In a machine of the character described comprising a forming die conveyer carrying forming dies having paper cups therein, forming punches in said dies, movable plungers carrying heading tools, housing for the plungers, a movable support for the housings, spring controlled locking fingers pivoted to the housings and normally engaging the plungers with a grip sufficient to effect the heading of the cups, and a shock absorbing spring back of each plunger so that when the heading dies meet with an undue resistance the fingers will disengage from the plungers and allow said plungers to retreat into the housings.

18. In a machine of the character described comprising an intermittently traveling forming punch conveyer, an overlying reciprocating support carrying plaiters, punch ejector force plungers, and punch extractors, an intermittently rotatable forming die conveyer underlying the punch conveyer, an intermittently rotatable plaiter die carrier overlying the forming die conveyer adapted to carry paper blanks, means for actuating all of the above moving parts to bring the plaiter dies under the plaiters and force a plaited cup into the dies, eject punches from the punch conveyer into the dies and apply force thereto, and engage the punch extractors by the downward movement of the reciprocating support and extract the punches and reseat them in the punch conveyer on the return movement of said support.

19. In a machine of the character described comprising a reciprocating support, plaiters, punch ejector force plungers, headers and punch extractors mounted thereon, an intermittently traveling forming punch conveyer, forming punches removably located therein, an intermittently rotatable forming die conveyer carrying forming dies and underlying the punch conveyer, an intermittently rotatable plaiter die carrier carrying plaiter dies and overlying the die conveyer, means for actuating all of the above moving parts to bring the plaiter dies under the plaiters and force a plaited cup through the plaiter dies into the forming dies, and eject the forming punches from their conveyer into the forming dies and exert a pressure thereon, head the edges of the cup and engage the extractors with the punches by a downward movement of the reciprocating support, and extract the punches and reseat them in their conveyer on the return movement of said support.

20. In a machine of the character described, the combination with paper feeding mechanism, blanking tools and plaiter tools, of crimping mechanism comprising opposed sets of crimpers, and means for imparting an undulatory movement to one set.

21. In a machine of the character described, the combination with paper feeding mechanism, blanking tools and plaiter tools, of crimping mechanism comprising opposed sets of crimpers, means for imparting to one set an undulatory motion, and a spring to permit of a yielding movement to the opposed set.

22. In a machine of the character described, the combination with paper feeding mechanism, blanking tools and plaiter tools, of opposed sets of crimper tools, alternate metallic and non-metallic blades in their crimping faces, means for imparting an undulatory movement to one set, and a spring to permit of a yielding movement to the opposed set.

23. In a machine of the character described, the combination with paper feeding mechanism, blanking tools and plaiter tools, of crimping mechanism comprising opposed sets of crimping tools having crimping blades, one set pivotally supported at the center and normally tilted, revolving means adapted to impart an undulatory motion thereto and successively bring all the blades into working engagement with the opposite crimping tool.

24. In a machine of the character described comprising paper feeding mechanism, a reciprocating gate, paper blanking punches mounted thereon, dies therefor, a second reciprocating gate carrying plaiters, punch ejectors and pressure plungers and punch extractors, an intermittently rotatable conveyer, forming dies therein, a traveling punch conveyer carrying removable forming punches, a plaiter die carrier, means for imparting an intermittent rotatable movement thereto to transport paper blanks from the blanking tools to the plaiters, both gates moving in unison to blank; plait the blanks and deposit the plaited blanks in the forming dies, eject the punches into the forming dies and apply pressure thereto on the downward stroke of the gates, and extract the punches from the dies and reseat them in their conveyer on the return stroke.

25. In a machine of the character described comprising paper feeding mechanism, crimping mechanism, blanking mechanism, plaiting mechanism, forming punch carrying mechanism, rotatable forming die carrying mechanism, cup heading mechanism, cup extracting mechanism, paraffining mechanism, all combined to operate in harmony to feed the paper, crimp, blank, plait, form, head and deliver a finished cup.

26. In a machine of the character described comprising paper feeding mechanism, paper blanking mechanism, combined plaiter die carrying and paper blank transporting mechanism, forming dies and their intermittently carrying mechanism, plaiters, forming punch mechanism and their intermittently operating conveyer in which the punches are removably located, cup heading mechanism, punch and cup extracting mechanism, all combined to operate in harmony to cut blanks, form a paper strip and deposit them onto the plaiter dies and transport them under the plaiters, plait and deposit the plaited cup into the forming dies, eject the forming punches into the dies and apply pressure thereto, forming a beading on the cup and extracting the punches from the dies and reseating them in their conveyer with the cups adhering thereto.

27. In a machine of the character described comprising an intermittently traveling forming punch conveyer, cup forming punches removably located therein, cup forming dies, mechanism for ejecting the punches from their conveyer into the dies and applying pressure thereto, mechanism for extracting the punches from the dies and reseating them in their conveyer with the cups adhering thereto.

28. In a machine of the character described comprising an intermittently traveling punch conveyer, cup forming punches removably located therein, cup forming dies, an intermittently rotatable conveyer therefor, mechanism for ejecting the punches from their conveyer into the dies and applying pressure and reseating them in their conveyer, mechanism for paraffining the cups, and means for ejecting the finished cups from the punches.

29. In a machine of the character described comprising in combination with an intermittently rotating cup forming die conveyer, plaiting mechanism adapted to plait paper blanks and deposit them into the dies, an intermittently traveling punch conveyer, cup forming punches removably seated therein, mechanism adapted to eject the punches from their conveyer into the dies and apply pressure thereto, cup heading mechanism, and punch extracting mechanism adapted to reseat the punches in their conveyer.

30. In combination, paper blanking punches, a reciprocating support therefor, plaiters, punch plungers, a reciprocating support therefor, both of said supports adapted to move in unison, an intermittently traveling conveyer forming punches removably located therein, an intermittently rotatable plaiter die carrier underlying said reciprocating supports, and an intermittently and horizontally rotatable forming die conveyer underlying the plaiter carrier.

31. In a machine of the character described comprising a rotatively moving cup forming die conveyer, a rotatively moving plaiter die carrier overlapping the conveyer and carrying paper blanks, a reciprocating plaiter head carrying plaiter fingers adapted to engage the paper blanks and plait said blanks through the plaiter dies and deposit the plaited blanks into the dies of the conveyer, automatically operated forming punches adapted to enter the dies of the conveyer, and means for applying pressure thereto, and means for removing them therefrom.

32. In a machine of the character described, a rotatively moving cup forming conveyer means for depositing paper blanks into the dies of the conveyer, forming punches adapted to enter the dies and remain seated therein while the die conveyer rotates.

In testimony whereof I affix my signature in presence of two witnesses.

HENRY A. HOUSE.

Witnesses:
JAMES FEELEY,
GEORGE W. FINN.